United States Patent
Eckstein et al.

(10) Patent No.: US 8,314,519 B2
(45) Date of Patent: Nov. 20, 2012

(54) ELECTROMECHANICAL LINEAR ACTUATOR

(75) Inventors: Denis Eckstein, Tubomgem (DE); Eberhard Heβ, Filderstadt (DE)

(73) Assignee: Parker-Origa GmbH, Filderstadt (DE)

( * ) Notice: Subject to any disclaimer, the term of this patent is extended or adjusted under 35 U.S.C. 154(b) by 42 days.

(21) Appl. No.: 12/774,058

(22) Filed: May 5, 2010

(65) Prior Publication Data

US 2011/0234021 A1    Sep. 29, 2011

(30) Foreign Application Priority Data

May 5, 2009 (DE) .......... 10 2009 020 040

(51) Int. Cl.
*H02K 41/02* (2006.01)
(52) U.S. Cl. ............... 310/12.31; 310/12.01
(58) Field of Classification Search ........... 310/12.01, 310/12.31, 80
See application file for complete search history.

(56) References Cited

U.S. PATENT DOCUMENTS

| | | | | |
|---|---|---|---|---|
| 5,257,014 A * | 10/1993 | Zimmermann | ............ | 340/686.1 |
| 5,440,183 A * | 8/1995 | Denne | ............ | 310/12.26 |
| 6,084,326 A * | 7/2000 | Nagai et al. | ............ | 310/80 |
| 6,326,706 B1 * | 12/2001 | Zhang | ............ | 310/12.31 |
| 6,329,728 B1 * | 12/2001 | Kitazawa et al. | ............ | 310/14 |
| 6,400,047 B1 * | 6/2002 | Hartramph et al. | ............ | 310/12.33 |
| 6,540,485 B2 * | 4/2003 | Nara et al. | ............ | 417/44.1 |
| 7,323,798 B2 | 1/2008 | Hartramph et al. | | |
| 7,337,883 B2 * | 3/2008 | Geyer | ............ | 188/156 |
| 2004/0198541 A1 | 10/2004 | Nagai et al. | | |
| 2005/0121985 A1 * | 6/2005 | Hartramph et al. | ............ | 310/14 |
| 2006/0201758 A1 * | 9/2006 | Geyer | ............ | 188/72.7 |

FOREIGN PATENT DOCUMENTS

| | | |
|---|---|---|
| DE | 4222365 A1 | 1/1994 |
| EP | 1496600 A2 | 7/2004 |
| EP | 1928074 A1 | 11/2006 |

\* cited by examiner

*Primary Examiner* — Thanh Lam
(74) *Attorney, Agent, or Firm* — Robert J. Clark

(57) ABSTRACT

An Electromechanical linear drive with a housing (10) and with at least one piston rod (16) protruding on one side form the housing (10), extending through an opening on the end face housing lid (11), supported by a push element (15) arranged for longitudinal movement in the interior of the housing (10), wherein the push element (15) for its movement is supported by a drive shaft driven by a drive and the piston rod (16) is arranged eccentric to the drive shaft, is characterized in that the push element (15) supporting the at least one piston rod (16) is guided relative to the housing (10) with a force transmitting twist protection formed as interlocking guiding elements arranged at the housing (10) and the push element (15).

15 Claims, 3 Drawing Sheets

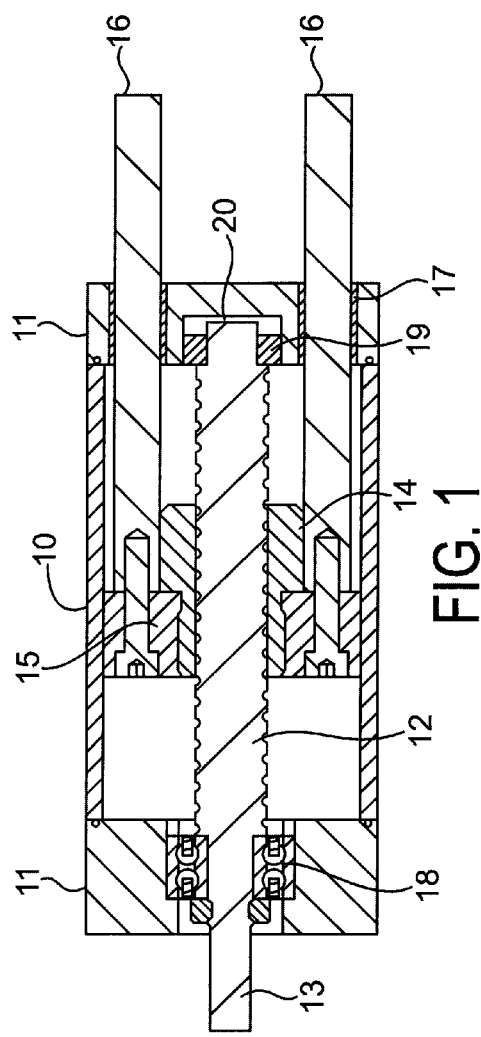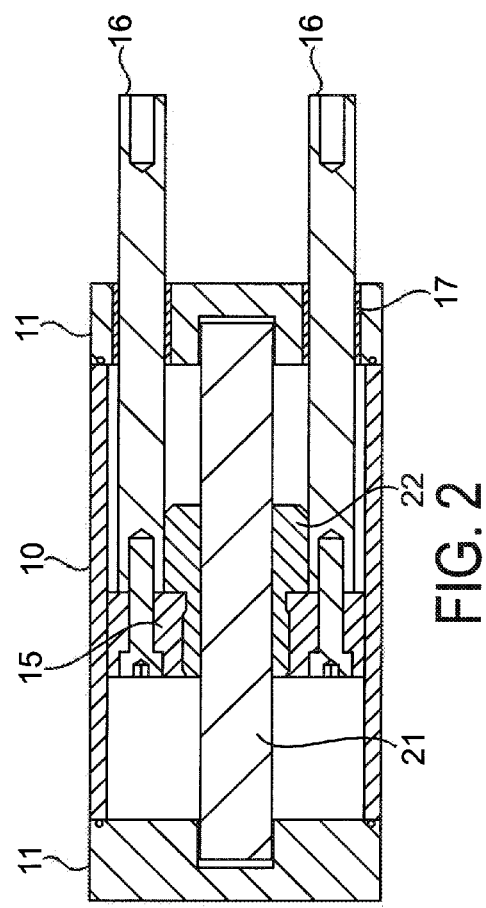

ELECTROMECHANICAL LINEAR ACTUATOR

CROSS REFERENCE TO RELATED APPLICATIONS

The present application claims the benefit of the filing date of German Patent Application No. 10 2009 020 040.1 filed May 1, 2009, the disclosure of which is incorporated herein by reference in its entirety.

TECHNICAL FIELD

The invention concerns a electromechanical linear drive with a housing and with at least one piston rod protruding on one side from the housing, extending through an opening on the end face housing lid, supported by a push element arranged for longitudinal movement in the interior of the housing, wherein the push element for its movement is supported by a drive shaft driven by a drive and the piston rod is arranged eccentric to the drive shaft.

BACKGROUND OF THE INVENTION

An electromechanical linear drive for the generation of translational feed motion with the above-mentioned features is known from the EP 1 496 600 A2. Under the effect of a drive formed as stator and rotor a rotatable drive shaft is mounted in the housing in both housing lids sealing the housing. On the drive shaft provided with an external thread a threaded nut as push element is guided that is connected firmly to a fork shaped adjusting rod, the fork limbs of which form two piston rods arranged eccentrically to the drive shaft, which extend through respective openings of the corresponding housing lid. When rotating the drive shaft the threaded nut forming the push element moves on the external thread of the drive shaft, thus affects an extension or retraction, respectively, of the piston rod.

The known linear drive has the disadvantage that the piston rods at the movement of the threaded nut are supported in the openings of the housing lid, so that the openings act as twist protection for the drive as well as the load connected to the piston rods, which is associated with corresponding stress on the piston rods and the openings in the housing lids respectively.

The object of the invention is therefore to further improve a linear drive with the initially mentioned generic features, so that the stress on the piston rods and/or housing lid through the moving load is reduced.

The solution to this object including advantageous arrangements and improved embodiments of the invention arises from the content of the claims following this description.

SUMMARY OF THE INVENTION

The invention provides for this purpose that the push element supporting the at least one piston rod is guided relative to the housing with a force transmitting twist protection formed as interlocking guiding elements arranged at the housing and the push element. The invention has the advantage that the push element is guided twist-protected with regard to the housing, so that the high torques imposed from the load and the piston rods on the push element or introduced by the drive shaft, can be received by the push element and transmitted into the housing. Because the push element is guided and held at that place where the force is transmitted onto the housing, the effective length for possible cases of kinking by high loads is strongly reduced. Because the piston rod or piston rods are not contributing to the twist protection, the piston rod or piston rods can eventually in an advantageous manner be guided in the housing by piston rod bearings which are not additionally strained, for example in form of slide bearings and be used for the transmission of very high forces.

According to one embodiment of the invention it may initially in a simple configuration be provided for that the twist protection consists of at least one strip like projection at the inner wall of the housing and at least one groove formed at the push element and suitably receiving the projection.

According to one modified embodiment of the invention it may be provided for that the twist protection consists of at least one guide rail mounted at the inner wall of the housing and at least one guide carriage arranged at the push element, wherein the guide carriage may be guided at the guide rail by means of additional friction reducing guiding means, which according to embodiments of the invention may consist of a ball bearing traveler or a guide roller. Associated there with is a smooth running during the motion of the push element driven by the threaded spindle, in the housing.

As far as in an alternative embodiment of the invention it is provided for that the twist protection in the interior of the housing consists of at least one guide rod mounted in the end-facing housing lids on both sides, that is received in a guide bearing formed at the push element, this has the advantage that only extremely low twisting angles can appear because of the large stability of the twist protection due to the fixation of the guide rods on both sides in the housing lids. Therefore the linear drive according to the invention is suitable for precise positioning with regard to the load imposed on the piston rod or piston rods. Here the gliding ability of the push element in the housing can be improved by arranging at least one guide bushing as guide bearing that can be formed as slide bushing or alternatively as ball bushing in the push element receiving the guide rod. It is advantageous if in symmetrical arrangement to the longitudinal axis of the threaded spindle there is a plurality of guide rods and correspondingly arranged guide bearings or guide bushings at the push element.

For the realization of the invention it is sufficient to mount a piston rod at the push element. According to one embodiment of the invention it can however be provided for, that a plurality of piston rods arranged at the push element protrude from the housing. For this purpose two piston rods are sufficient for the realization of the invention. However, also more than two piston rods in any arrangement relative to the drive shaft may be provided.

Preferentially, according to one embodiment of the invention a plurality of piston rods may be provided in a symmetrical arrangement to the drive shaft. Hereby the occurrence and influence of tilting moments on the component parts of the electro mechanical linear drive can be ruled out.

According to one embodiment of the invention it is provided for that the drive shaft is arranged in a manner known as such from the EP 1 496 600 on both sides of the housing lids sealing the end faces of the housing.

Insofar as the drive shaft is formed as a spindle drive, the rotational speed of the threaded spindle is generally determined by its bearing distance, meaning the supporting distance of its end bearings, it is provided for that according to one embodiment of the invention the threaded spindle is supported between its end bearings at the housing lids with at least one further bearing arranged in the interior of the housing; associated herewith is the advantage that a higher rotational speed is possible.

The concept according to the invention can be realized in accordance to embodiments of the invention with both drive concepts described above and belonging to the state of the art, namely with a drive mechanism in form of a linear drive as well as a drive mechanism in form of a spindle drive. Particularly with a drive mechanism in form of a spindle drive the aspect according to the invention of mounting the threaded spindle in both end face housing lids applies, because thereby the threaded spindle is subject to considerably lesser restrictions concerning rotational speed and extending speed.

Within the context of the invention it may be provided for that the threaded spindle is formed as a trapezoid threaded spindle, where there are the advantages of a self-inhibition and a large impulse force. Alternatively it may be provided for that the threaded spindle is formed as a ball screw spindle where there is a high precision and positioning accuracy. Also other types of spindles are applicable with the invention with no restrictions.

Regarding the different operating conditions it may be provided for that the threaded spindle in the end facing housing lids is arranged with an axial clearance taking the temperature expansion of the threaded spindle into account. In particular it may be provided for that at least one end of the threaded spindle is supported with a floating bearing placed on the housing lid.

Within the context of realizing the invention the threaded spindle may be connected to the electric motor with an interposed transmission in a manner known per se; but also a direct drive of the threaded spindle is possible depending on the arrangement of the motor.

Insofar as the motor may be flange mounted at the housing, the motor and the transmission, respectively, may be flange-mounted axially, at an angle or parallel at the drive lid and may optionally be linked with a drive shaft connected to the threaded spindle as known from several embodiments according to the state of the art.

BRIEF DESCRIPTION OF THE DRAWINGS

Embodiments of this invention will now be described in further detail with reference to the accompanying drawings, in which:

FIG. 1 is an electromechanical linear drive in spindle drive construction with two piston rods in a schematic sectional view;

FIG. 2 is the object of FIG. 1 with a drive concept formed as a linear drive;

DETAILED DESCRIPTION OF THE INVENTION

Figure 3:
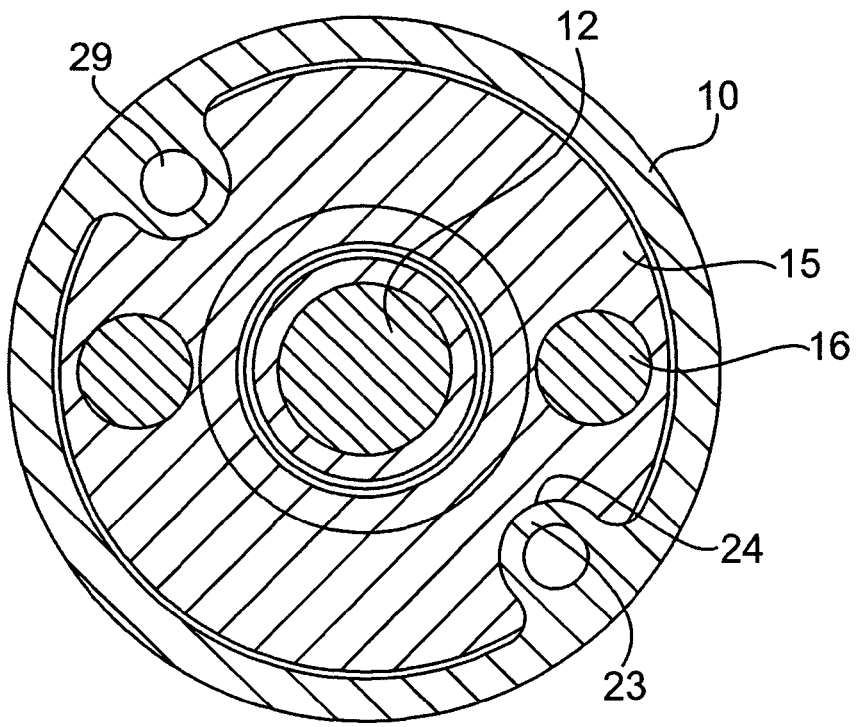
FIG. 3 is a front view of the push element guided twist-protected in the housing as part of the electromechanical linear drive according to FIG. 1 or 2.

As resulting initially from FIG. 1 a mainly cylindrical housing 10 is sealed by two housing lids 11 superimposed from the end face and closing the housing 10, wherein the housing lids 11 are connected to the housing 10 by mounting screws. In the interior of the housing 10 a threaded spindle 12 as drive shaft is arranged extending through the housing, that on the one side, the left housing side in the shown embodiment, reaches through the associated housing lid 11 with a drive set 13, so that the threaded spindle 12 can be rotated by an electrical motor, not shown connected to the drive set 13. The threaded spindle 12 is thereby supported in a suitable manner in both housing lids 11 by associated bearings. The support is accomplished by a fixed bearing 18 and a floating bearing 19 that allows an axial clearance 20 between the end face of the threaded spindle 12 and the associated housing lid 11 to take for example an eventual expansion of the threaded spindle 12 due to temperature into account.

On the threaded spindle 12 a threaded nut 14 is guided that is connected to a push element 15 embracing the threaded spindle 12, so that with rotating the threaded spindle 12 the push element 15 is moved in the longitudinal direction in the housing 10 under the influence of the threaded nut 14. At the push element 15 there are in the embodiment shown in FIG. 1, in a symmetrical arrangement two piston rods 16 mounted in an eccentric position to the threaded spindle 12, wherein the piston rods 16 extend through the assigned housing lid 11 in accordingly provided piston rod bearings 17 formed in particular as floating bearings, guided therein and protruding freely from the housing 10, so that a load can be attached at the end of the piston rods 16 in an manner known per se but not shown.

The embodiment shown in FIG. 2 differs from the embodiment according to FIG. 1 described above in the drive concept, which is based on the on the principle of a linear drive. Here a fixed magnetic rod 21 is arranged as drive shaft between the housing lids 11, serving as stator for the linear drive. With the push element 15 as support for the piston rod 16 a rotor 22 is connected having a coil arrangement that is moving in the longitudinal direction along the magnetic rod 21 due to accordingly generated changes in the magnetic field of the coil.

Figure 4:
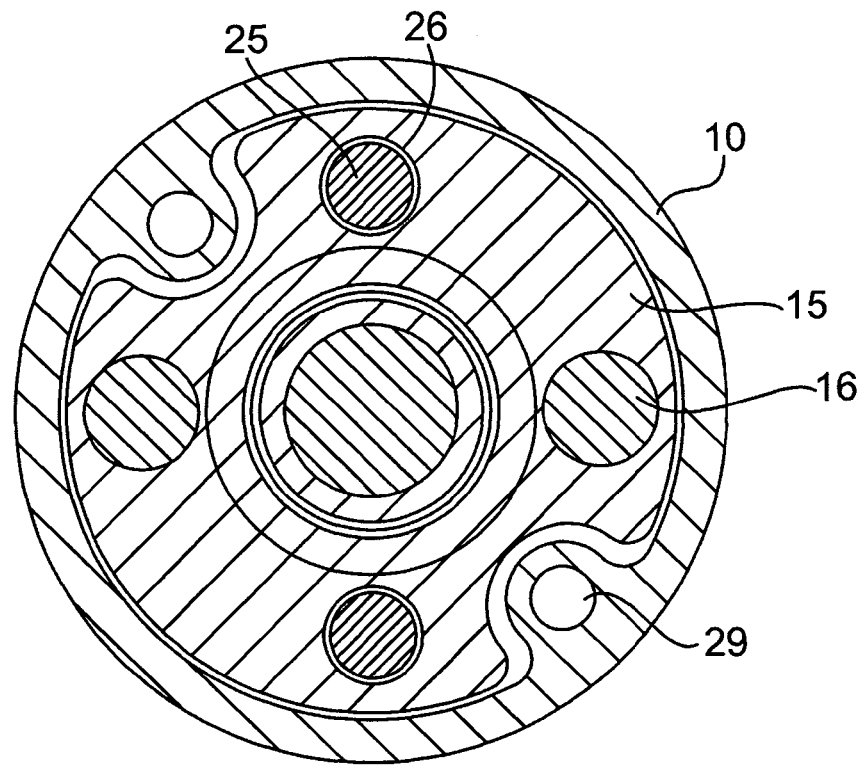
FIG. 4 is an alternative twist protection for the push element according to FIG. 3.
Figure 5:
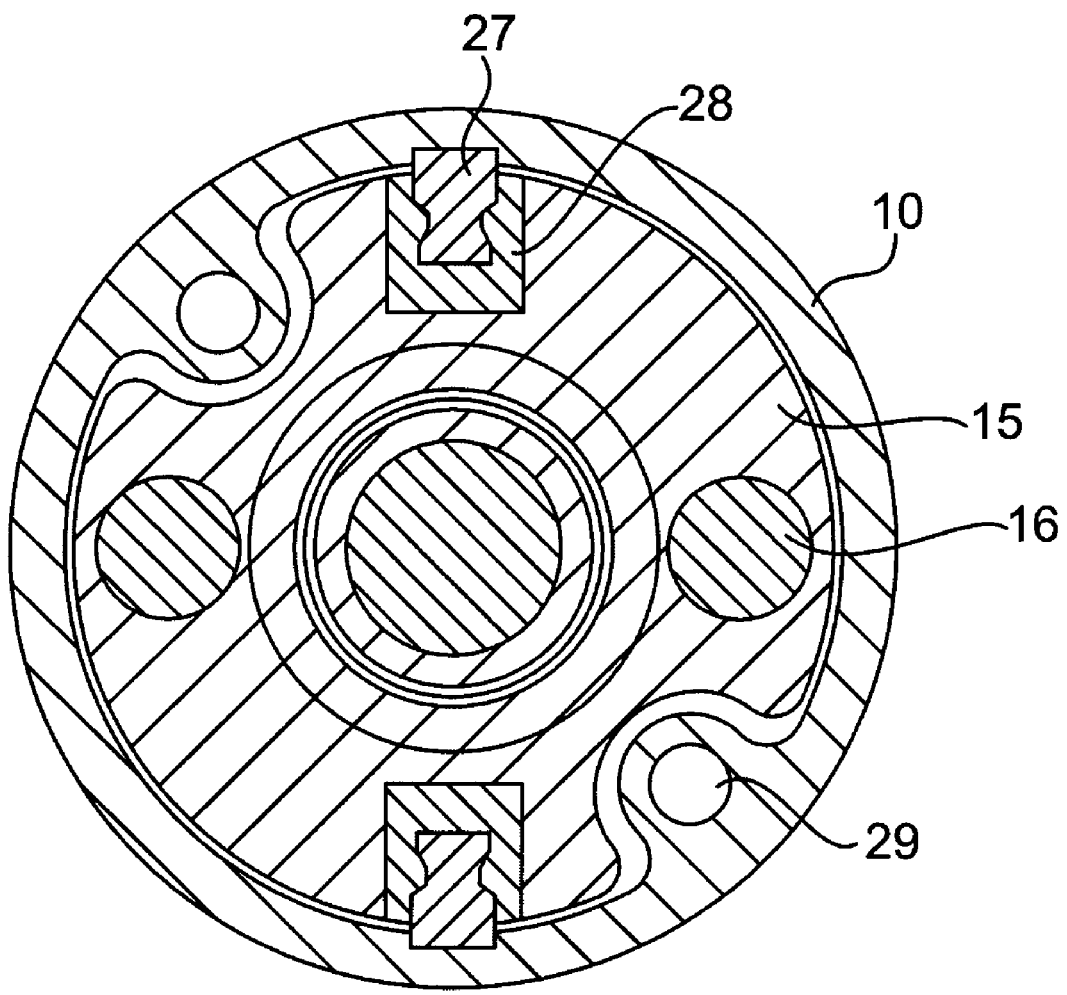
FIG. 5 is another alternative embodiment of the twist protection for the push element according to FIG. 3.

Insofar as it is relevant according to the invention that the push element 15 is guided twist-protected in the housing 10, embodiments regarding the form of such a twist protection are shown in FIGS. 3 to 5.

In the embodiment shown in FIG. 3, strip like projections 23 are provided for extending through the housing 10 between both housing lids 11 in a symmetrical distribution for forming a twist protection. The strip like projections 23 are received by accordingly formed grooves 24 at the outer perimeter of the push element 15, so that the push element 15 is positively engaged regarding the strip like projections 23 and guided twist-protected along the strip like projections 23 during its longitudinal movement. In the area of the strip like projections 23 there are mounting apertures 29 on the end face of the housing 10 to receive the screws used to attach the housing lid 11.

Alternatively to the projections 23 guide rods 25 are arranged between the housing lids 11 in the embodiment of the twist protection shown in FIG. 4 that are received by the guide bearings 26 formed in the push element 15. These guide bearings 26 can for example be formed as guide bushings in form of a ball bushing or a floating bushing. Also in this manner a twist-protected guiding of the push element 15 in the housing 10 is ensured.

Finally according to FIG. 5 a profiled guide rail 27 and at the push element 15 a carriage 28 embracing the guide rail 27 forming the twist protection are arranged at the housing 10, so that a twist-protected guiding of the push element 15 is ensured during its longitudinal movement in the housing 10 by the interaction of the carriage 28 and the guide rail 27.

The features of the subject-matter of these documents disclosed in the description above, the claims, the summary and the figures can be relevant for the realization of the invention in its different embodiments alone as well as in any combination.

The invention claimed is:

1. An electromechanical linear drive comprising a housing (10) and with at least one piston rod (16) protruding on one side from the housing (10), extending through an opening on the end face housing lid (11), supported by a push element (15) arranged for longitudinal movement in the interior of the housing (10), wherein the push element (15) for its movement is supported by a drive shaft driven by a drive and the piston rod (16) is arranged eccentric to the drive shaft, wherein the push element (15) supporting the at least one piston rod (16) is guided relative to the housing (10) with a force transmitting twist protection formed as interlocking guiding elements arranged at the housing (10) and the push element (15).

2. An electromechanical linear drive according to claim 1, wherein the twist protection consists of at least one strip like projection (23) at the inner wall of the housing (10) and at least one groove (24) formed at the push element (15) and suitably receiving the projection (23).

3. An electromechanical linear drive according to claim 1, wherein that the twist protection consists of at least one guide rail (27) mounted at the inner wall of the housing (10) and at least one guide carriage (28) arranged at the push element (15).

4. An electromechanical linear drive according to claim 3, wherein the carriage (28) is guided at the guide rail (27) by means of additional friction reducing guiding means.

5. An electromechanical linear drive according to claim 4, wherein the guiding means consist of a ball bearing traveler or a guide roller.

6. An electromechanical linear drive according to claim 1, wherein the twist protection consists of at least one guide rod (25) mounted in the end-facing housing lids (11) on both sides, that is received in a guide bearing (26) formed at the push element (15).

7. An electromechanical linear drive according to claim 6, wherein at least one glide bushing, receiving in it the guide rod (25), is arranged in the push element (15).

8. An electromechanical linear drive according to claim 6, wherein at least one ball bushing, receiving in it the guide rod (25), is arranged in the push element (15).

9. An electromechanical linear drive according to claim 6, wherein in symmetrical arrangement to the longitudinal axis of the threaded spindle (12) a plurality of guide rods (25) and accordingly arranged guide bearings (26) are arranged at the push element (15).

10. An electromechanical linear drive according to claim 1, wherein a plurality of piston rods (16) protruding from the housing (10) are arranged at the push element (15).

11. An electromechanical linear drive according to claim 10, wherein the plurality of piston rods (16) are provided for in a symmetrical arrangement relative to the drive shaft.

12. An electromechanical linear drive according to claim 1, wherein the drive shaft is arranged on both sides of the housing lids (11) sealing the end faces of the housing (10).

13. An electromechanical linear drive according to claim 12, wherein the drive shaft is supported between its end bearings at the housing lids (11) with at least one further bearing arranged in the interior of the housing (10).

14. An electromechanical linear drive according to claim 1, wherein the drive mechanism is formed as a spindle drive with a rotatable threaded spindle (12) as drive shaft and by rotating the threaded spindle (12) the push element (15) can be moved in a longitudinal direction.

15. An electromechanical linear drive according to claim 1, wherein the drive mechanism is formed as a linear drive and the drive shaft is formed as a magnetic rod (21) and the push element (15) can be moved in a longitudinal direction along the magnetic rod (21) by a rotor (22) having a coil arrangement.

* * * * *